United States Patent [19]
Lyford

[11] Patent Number: 5,783,276
[45] Date of Patent: Jul. 21, 1998

[54] INSERT MOLDED BEZEL AND METHOD OF MANUFACTURING

[75] Inventor: J. Steve Lyford, Portland, Oreg.

[73] Assignee: Tektronix, Inc., Wilsonville, Oreg.

[21] Appl. No.: 855,064

[22] Filed: May 13, 1997

[51] Int. Cl.[6] .................. B32B 3/02; B28B 5/00
[52] U.S. Cl. .................. 428/79; 428/155; 428/167; 428/187; 428/195; 264/241; 264/297.2
[58] Field of Search .................. 428/13, 14, 38, 428/68, 79, 167, 141, 192, 155, 187, 195; 156/277, 245; 264/132, 241, 259, 297.2, 328.1, 510; 368/295

[56] References Cited

U.S. PATENT DOCUMENTS 2,749,640  6/1956  Scott ................................. 428/79
2,891,340  6/1959  Markus et al. .................... 428/79
4,605,575  8/1986  Auld et al. ........................ 428/14

Primary Examiner—Donald Loney
Attorney, Agent, or Firm—Bennet K. Langlotz

[57] ABSTRACT

A method of manufacturing a plastic shell by providing a printed appliqué having a central portion with a peripheral skirt portion having an edge, then inserting the appliqué into the recess on a first side of a mold. The skirt of the appliqué has a length greater than the depth of the recess, so that the edge of the skirt extends beyond the parting line. The second side of the mold is closed to enclose the recess, and has a second recess that receives the edge of the skirt on the second side of the parting line. Plastic material is injected into the closed mold pressing the appliqué against the first side, and providing a bezel with an appliqué that covers the exterior of the front portion, and which extends to cover the skirts beyond the parting line.

20 Claims, 4 Drawing Sheets

INSERT MOLDED BEZEL AND METHOD OF MANUFACTURING

FIELD OF THE INVENTION

The invention relates to molding of plastic parts, and more particularly to insert molding using preprinted sheets.

BACKGROUND AND SUMMARY OF THE INVENTION

To reduce the complexity and cost of manufacturing plastic parts, "in-mold decorating" has been used to eliminate secondary printing steps, and to avoid multiple injection steps using conventional insert molding. For instance, an automotive instrument bezel may require printed legends, back-lit translucent legends, and clear display windows in a single molded plastic part otherwise appearing opaque black or any other color. Using in-mold decorating, a plastic appliqué sheet is preprinted with the desired background color, legends using colored or translucent inks, and clear portions. The appliqué is thermoformed to the approximate shape of the finished bezel (if the bezel is not substantially flat), and is trimmed using a die cutter or steel ruled die to trim the periphery and to form any windows or switch apertures. The formed appliqué is inserted into an injection mold, and clear plastic is injected behind the appliqué, forcing it to take the shape of the mold, so that the appliqué forms the external surface of the bezel.

Using this conventional method, the edge of the appliqué does not perfectly correspond to the edge of the bezel. Mechanical tolerances of appliqué cutting and other steps require that some clearance be provided between the edge of the appliqué and the mold surface that defines the edge of the finished part. In the absence of such clearance, the edge of the appliqué may be crushed and buckled by the closing mold, yielding defective parts. In addition such crushing leads to molding tool damage or premature wear. In practice, the clearance gap is uneven due to the unpredictability of material flow and appliqué cutting and stretching during molding. This causes a wavy black edge visible in the clear molding material which is unattractive, particularly at corners of a bezel where stretching is most unpredictable. For applications in which the edge of the bezel is concealed, such as an instrument panel recessed into an automotive dash board, the wavy edge is concealed, and is of little concern. However, for applications such as hand held instrument housings where all surfaces are visible, and a precision appearance is required, current in-mold decorating techniques are inadequate.

The embodiment disclosed herein overcomes these limitations by providing a method of manufacturing a plastic shell by providing a printed appliqué having a central portion with a peripheral skirt portion having an edge, then inserting the appliqué into the recess on a first side of a mold. The skirt of the appliqué has a length greater than the depth of the recess, so that the edge of the skirt extends beyond the parting line. The second side of the mold is closed to enclose the recess, and has a second recess that receives the edge of the skirt on the second side of the parting line. Plastic material is injected into the closed mold pressing the appliqué against the first side, and providing a bezel with an appliqué that covers the exterior of the front portion, and which extends to cover the skirts beyond the parting line.

DETAILED DESCRIPTION OF A PREFERRED EMBODIMENT

Figure 1:
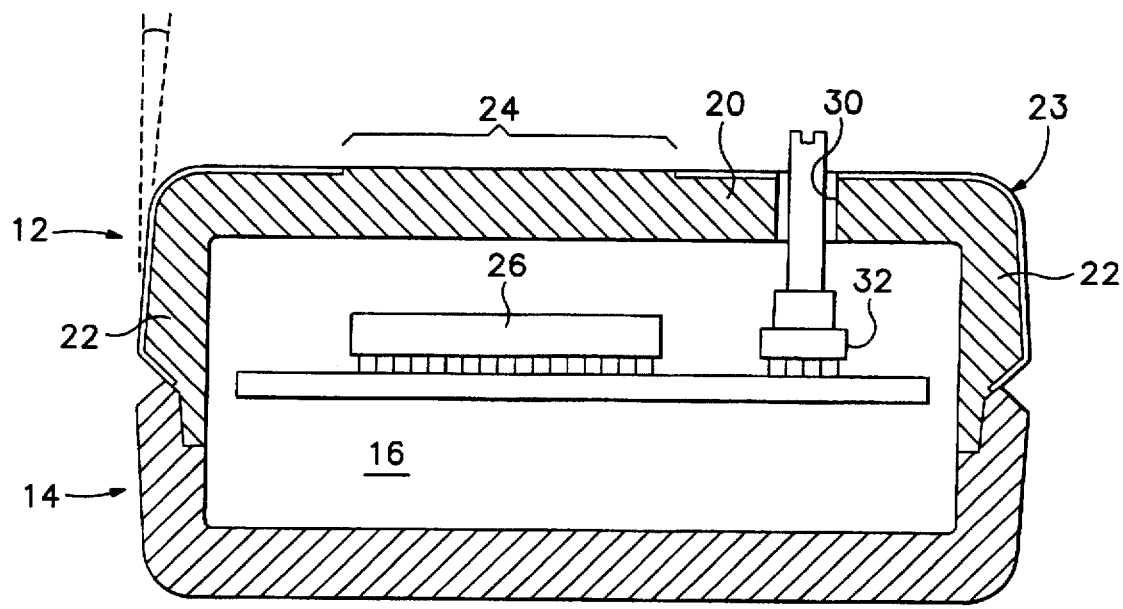
FIG. 1 is a sectional side view of a hand held instrument case according to a preferred embodiment of the invention.

FIG. 1 shows a hand held instrument with a housing 10 having a front bezel 12 and a rear cover 14 enclosing a chamber 16 containing electronic circuitry and components. Although a multitude of housing configurations may be used without departing from the principles of the invention, the illustrated housing has a rectangular box-like shape.

The front bezel has a generally flat central panel portion 20, with an integral side skirt panel 22 depending downward at each edge. The upper surface of the central panel portion 20 is covered with a thin plastic film appliqué 23 that extends over the edges to cover each of the side skirts. The appliqué may be tinted to provide the desired color of the finished housing, and may have printed legends, or unprinted portions providing visible text or legends against the printed background. As shown, the appliqué may define a window aperture 24 that reveals the bezel material behind; in this case, a transparent thermoplastic material such as polycarbonate provides a window for viewing an electronic display 26 in the chamber 16. Alternatively, windows may be created without an aperture in the appliqué by leaving an unprinted window portion of the appliqué, and by coating the exterior surface with a scratch resistant coating to preserve transparency of the appliqué material. A hole 30 through both the appliqué and the bezel material provides mechanical access for a switch 32. In the preferred embodiment, the appliqué has been vacuum formed to approximate the finished shape, and trimmed to provide relatively even edges.

Figure 2:
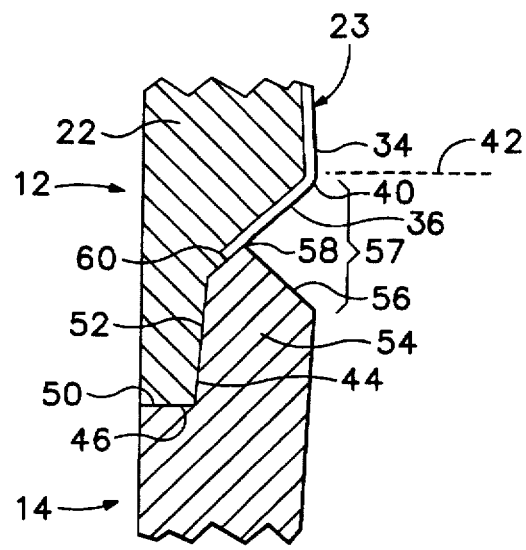
FIG. 2 is an enlarged sectional view of the embodiment of FIG. 1.

FIG. 2 shows details of the joint or seam between the front bezel and the rear cover. The bezel side skirt has a major exterior surface 34 that may be nearly vertical or perpendicular to the central panel portion, but which has a slight draft angle so that it faces slightly upward from a lateral direction. The surface 34 joins an angled second surface 36 at an edge 40 coinciding with a parting line 42. The second surface 36 is angled laterally and downwardly away from the parting line, at about a 45 degree angle as illustrated. A third surface 44 extends downward more vertically, and terminated at a downward-facing edge face 46.

The rear cover 14 mates with the bezel, and defines a ledge 50 and inner wall 52 forming a step receiving the edge of the bezel and contacting the third surface 44 and edge 46. A rim 54 covers the third surface and part of the second surface of the bezel skirt, and has an angled surface 56 that faces upwardly and laterally at about a 45 degree angle. Together, the cover surface 56 and bezel second surface 36 define a V-shaped groove 57 providing an aesthetic reveal feature that makes slight dimensional variations undetectable relative to the width of the groove, analogous to a conventional rectangular channel reveal feature.

The edge of the rear cover reveals only part of the sloped bezel second surface 36, covering the portion of the bezel that extends beyond a coverage line 58 at the vertex of the V-shaped groove. The appliqué 23 has an edge 60 that extends beyond the coverage line 58 so that the edge is hidden from view. Because the appliqué is likely to have dimensional variations along its edge and between different parts, the edge extends by more than the expected manufacturing tolerance. In addition to providing a concealed edge for aesthetic benefits, the appliqué effectively covers edge 36 at the parting line 42 around the entire periphery of the bezel. This captures and prevents any molding flash from forming at the edge, reducing the need for trimming, even as a molding tool wears.

Manufacturing

Figure 3:
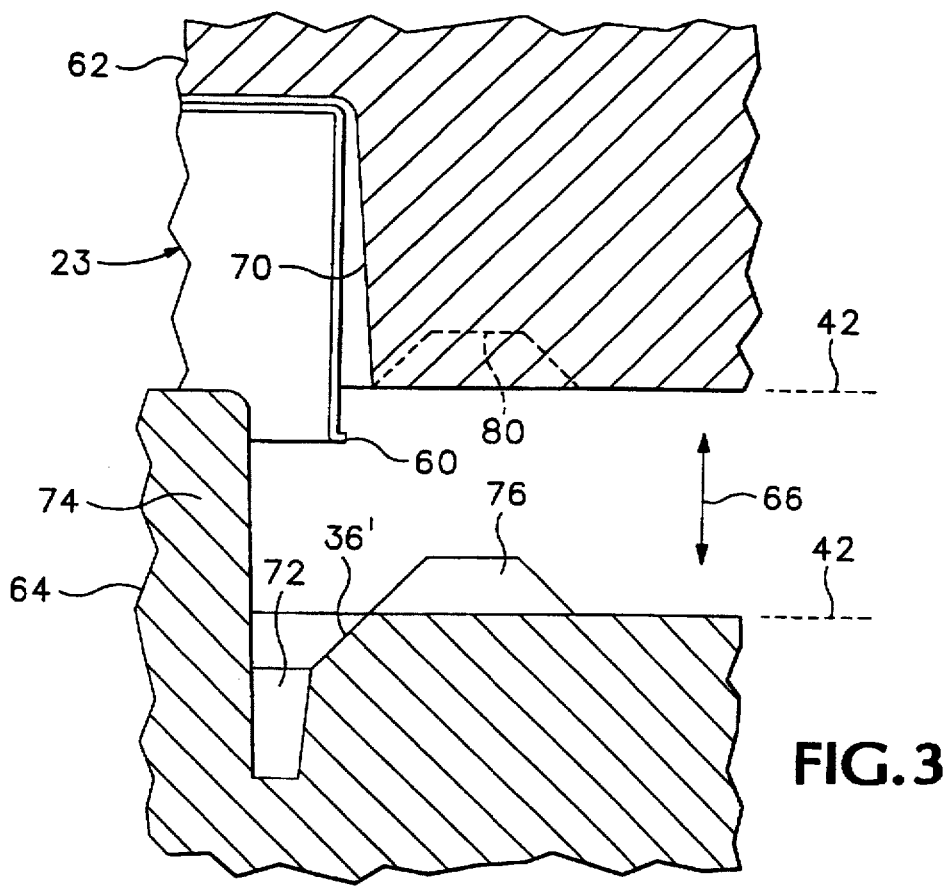
FIGS. 3, 4, and 5 are sectional side views of a sequence of manufacturing steps for producing the embodiment of FIG. 1.
Figure 4:
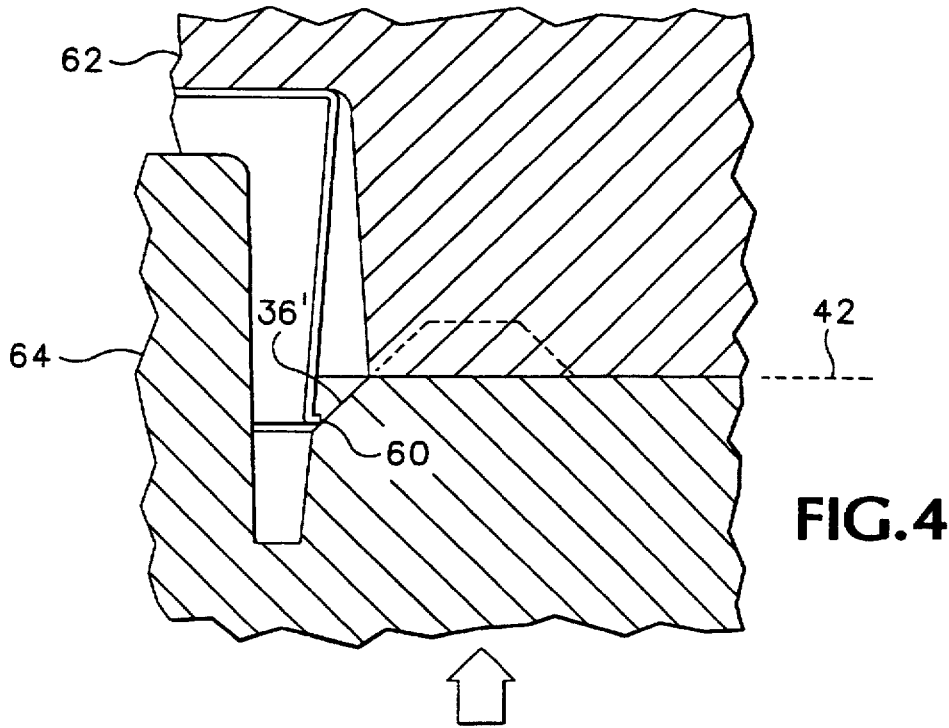
Figure 5:
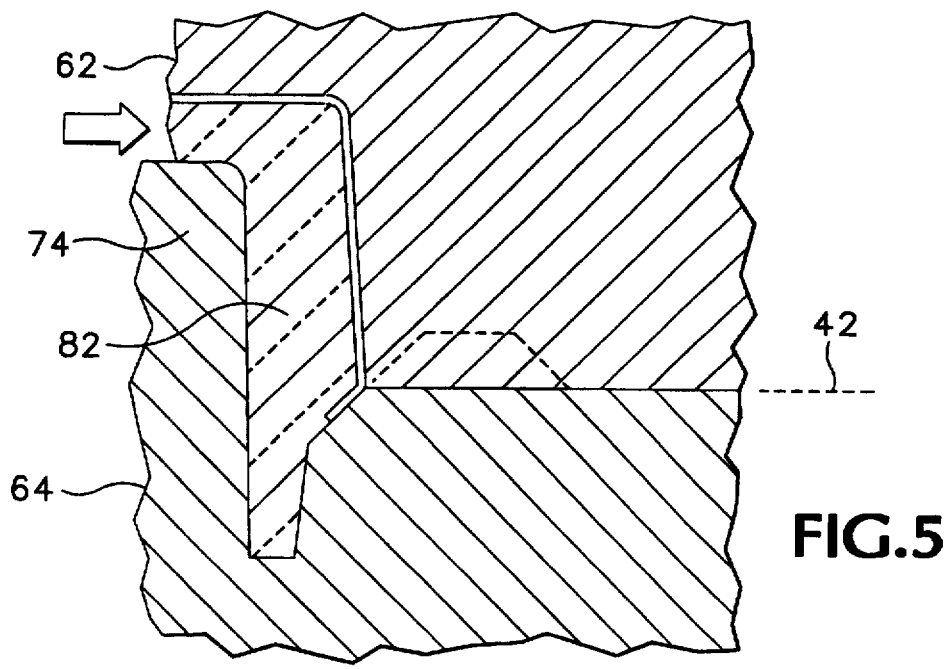
Figure 6:
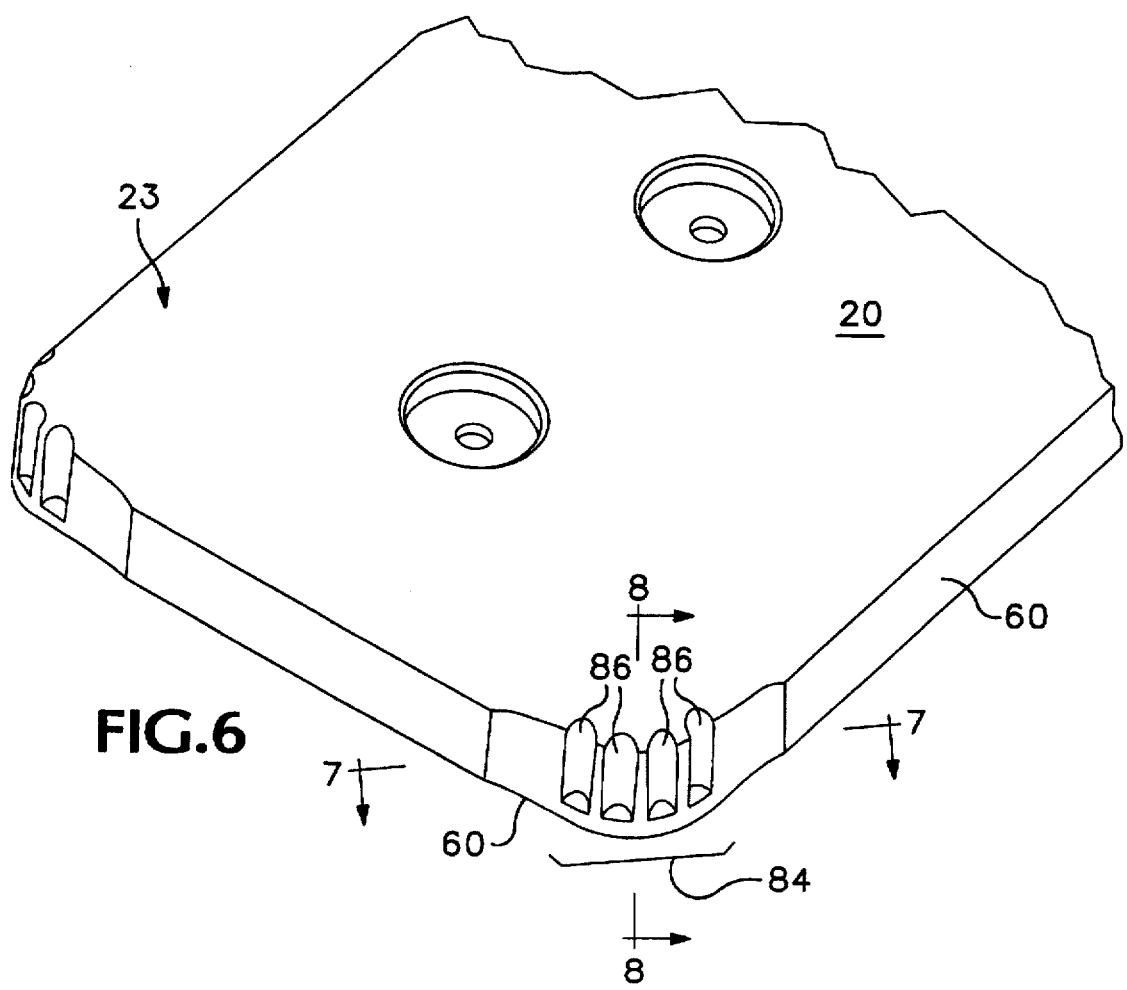
FIG. 6 is an isometric view of an appliqué portion of the embodiment of FIG. 1.

FIGS. 3 through 5 show the process of insert molding the front bezel of the preferred embodiment. A molding tool having a first part 62 and a second part 64 are movable toward and away from each other along an axis 66 between an open position (shown) and a closed position. The first tool part defines a cavity 70 having a depth corresponding to the depth of the bezel beyond the parting line 42. The second tool part 64 defines a channel 72 shaped to form the bezel portion below the parting line. The channel surrounds a core 74 that largely fills the cavity 70 when the tool is closed, and which forms the chamber in the finished bezel. Spaced apart at intervals along the channel are a plurality of sloped guide elements 76 having a sloped surface facing upwardly and medially, coplanar with a mold surface 36' that forms surface 36 in the finished product. A corresponding number of closely sized pockets 80 are defined in the opposite surface of the first tool part 62. While the guide elements might be elongated to extend about the entire channel without spaces in between to provide a sloped parting line, this is undesirable because it would require a knife edge at the parting line of the upper tool portion, creating a tool maintenance and life disadvantage.

The appliqué 23 has been vacuum formed to provide an open box shape that fills the cavity 70 at the upper surface, but which does not flare outward to as great of a draft angle. The lower edge 60 of the appliqué extends laterally only as far as it is intended to be position in the finished product, which avoids the crushing or buckling of the edge that might occur in the corners of the bezel otherwise if the sheet edge were forced medially during processing. The edge 60 extends beyond the parting line 42 of the first tool portion 62 so that it first contacts the sloped surface 36 as the tool is closed. If the sides of the appliqué have bowed slightly, the sloping surface acts as a wedge to position the appliqué edge upon closure. The guide elements 76 serve the same purpose to correct any significant bowing that may occur along a long straight edge of the appliqué, preventing the appliqué edge from being crushed between the tool halves.

As shown in FIG. 4, the tool halves have been shifted to the closed position, and the appliqué edge is pressing on mold surface 36'. As shown in FIG. 5, a molten transparent plastic material 82 has been injected into the space between the appliqué and the mold core 74. The pressure and heat of the injected plastic and the flexibility of the appliqué causes the appliqué to be forced laterally against the mold surfaces, and to fill the angled space at the parting line. Along the intermediate portions of the straight sides of the bezel, the appliqué behaves as shown, bending only in two dimensions without stretching or compressing over its area.

Figure 7:
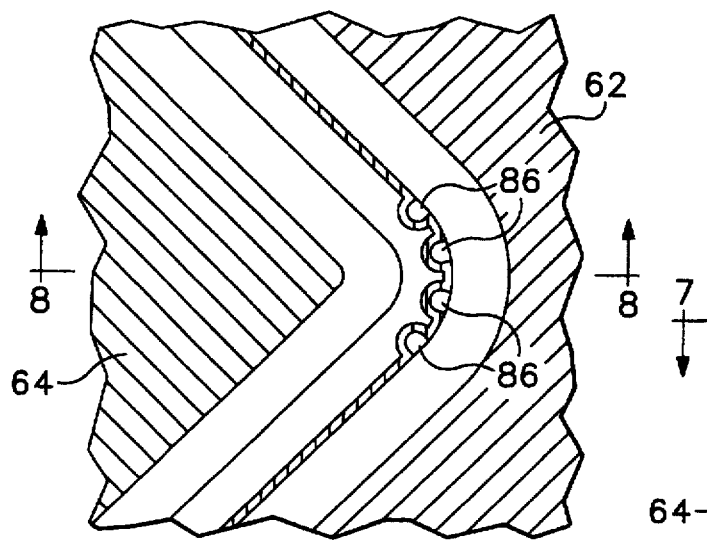
FIGS. 7 and 8 are enlarged sectional views of a corner portion of the embodiment of FIG. 1 at a first manufacturing step.
Figure 8:
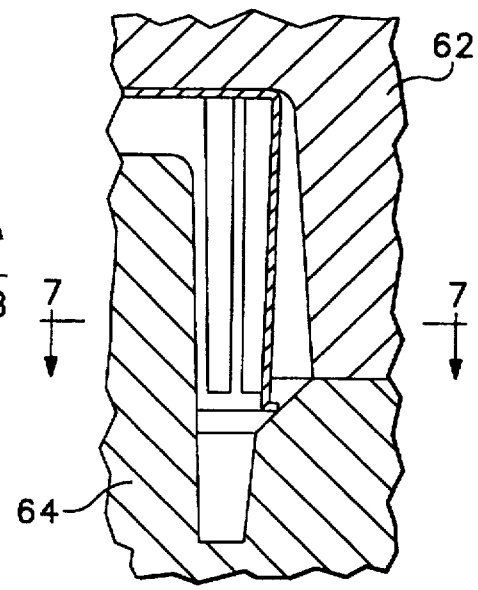
Figure 9:
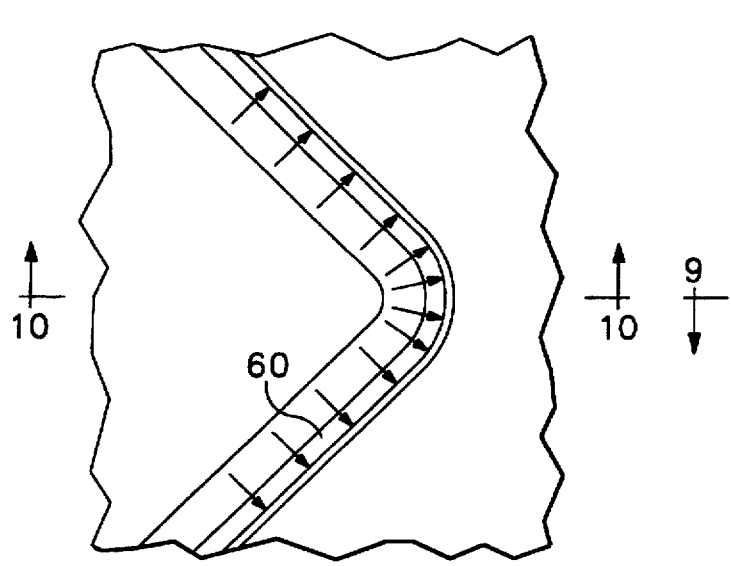
FIGS. 9 and 10 are enlarged sectional views of a corner portion of the embodiment of FIG. 1 at a second manufacturing step.
Figure 10:
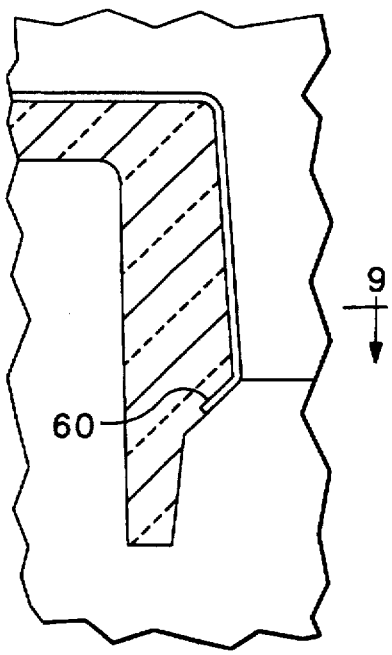

However, at the corners, or over any portion of a periphery having a rounded profile as might be required in alternative designs, the appliqué must either stretch or compress from its original vacuum formed shape to conform to the shape of the mold. Particularly, the appliqué must flare outward as it conforms to the skirt above the parting line, but flare inward below the parting line. With the rapid process of injection molding, the appliqué does not have sufficient time to stretch readily to generate the outward bulge at the parting line at the corners. To ensure that the appliqué edge extends low enough to be covered by the edge of the lower cover, the lower edge of the appliqué is formed initially to the dimensions intended in the finished part. Thus, the edge will not be appreciably stretched or compressed. However, the intermediate portions of the skirt at the corner 84 will require stretching to extend fully at the parting line. Because this is beyond the capabilities of the appliqué material under normal molding conditions, the skirt at the corner 84 is provided with several vertical pleats or flutes 86. These unfold into a smooth surface sized to fill the mold corner without substantial stretching. The flutes are deepest at the parting line, allowing greatest stretching where needed, and taper toward the edge and central panel portion of the appliqué. FIGS. 7 and 8 illustrate the pleats and their appearance before the plastic material is injected, and FIGS. 9 and 10 illustrate how the pleats are unfolded to a flat condition.

In the preferred embodiment, the appliqué is formed of polycarbonate material, with a thickness of 0.015 inch (0.38 mm.) The non conductive nature of the material ensures compliance with safety standards for electrical instruments, and the thickness permits conformal flexing not possible with more rigid material alternatives. The plastic molding material is preferably also polycarbonate material. The bezel is 3.25 inches (83 mm) by 6 inches (152 mm) by 0.85 inches (22 mm) overall, with a typical wall thickness of 0.10 inch (2.5 mm.)

The appliqué and molding materials are selected to be compatible. Under the heat and pressure of molding, a thin layer of the appliqué melts, creating a bond that provides effective adhesion. In the preferred embodiment, the materials are the same formulation of polycarbonate, although other paired materials may be used. Non-identical but compatible materials such as polycarbonate-ABS may also be used in conjunction with polycarbonate. When the rear surface of the appliqué is printed with legends and the like, the printing ink also becomes part of the melted layer, and should be selected for compatibility to avoid compromising mechanical integrity. When non-compatible ink is required, it should be printed on the external surface of the appliqué.

While the disclosure is made in terms of a preferred embodiment, the invention is not intended to be so limited.

I claim:

1. A method of manufacturing a plastic shell comprising the steps:

providing a printed appliqué having a central portion and a skirt portion depending from the periphery of the central portion and terminating at an edge;

inserting the appliqué in a first mold portion having a first recess sized to receive the appliqué, the first recess defined by a peripheral wall terminating at an line coincident with a parting line of the mold;

the skirt of the appliqué having a length greater than the depth of the first recess, such that the edge of the skirt extends beyond the parting line;

moving a second mold portion into a closed position in contact with the first mold portion to enclose the recess, the second mold portion defining a second recess registered with the skirt of the appliqué such that a portion of the skirt is received in the second recess when in the closed position; and injecting plastic material into the first and second recesses to a region between the appliqué and the second mold portion, including pressing the appliqué against the first recess.

2. The method of claim 1 wherein providing the appliqué includes providing a flat sheet of plastic and thermoforming the sheet to provide the skirt portion.

3. The method of claim 2 including cutting the appliqué to define the edge.

4. The method of claim 2 wherein the appliqué has a corner at which the skirt forms an angle, and wherein thermoforming the sheet includes forming expandable ridges in the skirt, such that the corner of the skirt may expand to fill the recess.

5. The method of claim 1 wherein pressing the appliqué against the first recess includes extending an intermediate portion of the skirt laterally beyond the edge of the skirt.

6. The method of claim 1 wherein pressing the appliqué against the first recess includes forming an edge along an intermediate portion of the skirt.

7. The method of claim 6 wherein the edge corresponds to the parting line of the mold.

8. A bezel comprising:

a central panel portion having an exterior surface facing a first direction and an interior surface facing an opposite second direction;

a skirt depending from a periphery of the panel portion and angularly disposed therefrom at least somewhat toward the second direction;

the skirt having a major first surface facing away from the central panel portion, and at least slightly toward the first direction;

the skirt having a second surface meeting the first surface at a parting line edge, and facing away from the central panel portion and at least slightly toward the second direction, such that the first and second surfaces have draft angles in opposite directions; and a single sheet of printed material covering and defining the exterior surface of the central panel portion and extending over the first surface of the skirt, and covering and defining at least a portion of the second surface of the skirt.

9. The bezel of claim 8 wherein the skirt encompasses the central panel portion to define a recess facing the second direction.

10. The bezel of claim 8 wherein the entire first surface is covered by the sheet.

11. The bezel of claim 8 wherein the sheet extends beyond the parting line.

12. The bezel of claim 8 including a rear cover matable with the skirt to define a chamber, and wherein the rear cover has a periphery partially covering a lower portion of the second surface of the skirt, and revealing an upper portion of the second surface of the skirt.

13. The bezel of claim 12 wherein the sheet entirely covers the upper portion of the second surface of the skirt, such that the edge of the sheet is hidden by the lower cover.

14. The bezel of claim 12 wherein the rear cover has a mating surface facing at least partially in the first direction and partially inwardly at an angle corresponding to the second surface of the skirt, such that the mating surface makes face-to-face contact with the second surface of the skirt.

15. The bezel of claim 12 wherein the cover includes a peripheral surface facing outwardly and partially toward the first direction, and wherein the peripheral surface and the second surface of the skirt define a V-shaped groove when mated.

16. A molded plastic bezel comprising:

an appliqué sheet having a first surface comprising a major outer surface portion of the bezel, and an opposed second surface;

a casting material adhered to and integral with the second surface;

a parting line defining a boundary between a first bezel portion and a second bezel portion;

the respective surfaces of the first bezel portion and the second bezel portion having draft angles such that the bezel may be readily demolded; and the appliqué covering a major portion of the first bezel portion, and extending across the parting line to cover at least some of the second bezel portion.

17. The bezel of claim 16 wherein the sheet and the casting material are of the same material.

18. The bezel of claim 16 wherein the parting line extends about the entire periphery of the entire bezel, and wherein the appliqué extends across the entire parting line.

19. The bezel of claim 16 wherein the parting line defines a junction between angularly offset surfaces.

20. The bezel of claim 16 including a rear cover matable with the bezel to cover a portion of the second portion of the bezel, and wherein the entire second portion is covered by an element selected from the group comprising the rear cover and the appliqué sheet.

* * * * *